(12) United States Patent
Sudo et al.

(10) Patent No.: US 8,308,300 B2
(45) Date of Patent: Nov. 13, 2012

(54) COLOR SEPARATION OPTICAL SYSTEM AND IMAGE PROJECTION APPARATUS

(75) Inventors: Takashi Sudo, Utsunomiya (JP); Hiroyuki Kodama, Utsunomiya (JP); Makoto Takahashi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 919 days.

(21) Appl. No.: 11/671,140

(22) Filed: Feb. 5, 2007

(65) Prior Publication Data
US 2007/0182933 A1 Aug. 9, 2007

(30) Foreign Application Priority Data
Feb. 9, 2006 (JP) .................. 2006-032415

(51) Int. Cl.
*G03B 21/14* (2006.01)
(52) U.S. Cl. .......................... 353/20; 353/33
(58) Field of Classification Search .............. 353/20, 353/33, 37, 50, 51, 73, 77, 78, 81, 98, 99
See application file for complete search history.

(56) References Cited

U.S. PATENT DOCUMENTS

| | | | | |
|---|---|---|---|---|
| 5,453,859 A * | 9/1995 | Sannohe et al. | ................. | 349/9 |
| 5,579,138 A * | 11/1996 | Sannohe et al. | ................. | 349/96 |
| 5,967,635 A * | 10/1999 | Tani et al. | ................. | 353/20 |
| 6,678,015 B2 * | 1/2004 | Yi et al. | ................. | 348/782 |
| 6,791,750 B2 * | 9/2004 | Masubuchi et al. | ........... | 359/487 |
| 6,945,654 B2 * | 9/2005 | Newell et al. | ................. | 353/81 |
| 6,971,747 B2 * | 12/2005 | Newell et al. | ................. | 353/3 |
| 7,008,059 B2 * | 3/2006 | Oakuyama et al. | ............. | 353/20 |
| 7,104,650 B2 * | 9/2006 | Pentico et al. | ................. | 353/20 |
| 7,108,374 B2 * | 9/2006 | Pentico et al. | ................. | 353/20 |
| 2004/0051947 A1 * | 3/2004 | Kagawa et al. | ............. | 359/495 |
| 2004/0066492 A1 * | 4/2004 | Nakashima et al. | ........... | 353/20 |
| 2005/0275807 A1 * | 12/2005 | Okuyama et al. | ............... | 353/20 |

FOREIGN PATENT DOCUMENTS

| JP | 05-303085 | 11/1993 |
|---|---|---|
| JP | 2003-233124 A | 8/2003 |

* cited by examiner

*Primary Examiner* — Francis M Legasse, Jr.
*Assistant Examiner* — Bao-Luan Le
(74) *Attorney, Agent, or Firm* — Rossi, Kimms & McDowell LLP

(57) ABSTRACT

A color separation optical system is disclosed which is effective in improving black color and black unevenness. Linearly polarized light impinging on a dichroic surface at an incident angle smaller than 45 degrees and then impinging on a polarization beam splitting surface at an incident angle larger than 45 degrees is referred to as first incident-angle light. A wavelength which is longer than a wavelength at the maximum transmittance of the dichroic surface for the first incident-angle light and at which the transmittance of the dichroic surface for the first incident-angle light is 10% is referred to as Wa, and a wavelength range shorter than Wa is referred to as W. The polarization beam splitting surface has a characteristic in which its transmittance for the first incident-angle light in the wavelength range W is 5% or lower.

7 Claims, 10 Drawing Sheets

COLOR SEPARATION OPTICAL SYSTEM AND IMAGE PROJECTION APPARATUS

BACKGROUND OF THE INVENTION

The present invention relates to a color separation optical system and an image display optical system which are used for an image projection apparatus such as a liquid crystal projector and which separate light from a light source into a plurality of light components for colors to direct the light components to light modulation elements such as liquid crystal panels.

To improve the contrast characteristics of images projected by an image projection apparatus, it is necessary to reduce a range of incident angles of a luminous flux entering an optical element such as a polarization beam splitter sensitive to incident angle characteristics in a color separation optical system or a color separation/combination optical system.

Japanese Patent Laid-Open No. H05(1993)-303085 has disclosed an optical system in which light from a light source is divided into a plurality of luminous fluxes by a lens array to form secondary images of the light source, and the plurality of luminous fluxes are caused to overlap on a liquid crystal panel to illuminate it. The optical system is provided with an aperture for limiting the luminous fluxes near the secondary images of the light source to achieve a reduction of a range of incident angles on an optical element sensitive to incident angle characteristics.

Although the optical system disclosed in Japanese Patent Laid-Open No. H05(1993)-303085 can improve the contrast of images, the limitation of the luminous fluxes near the secondary images of the light source significantly decreases the amount of light which illuminates the liquid crystal panel. In other words, the resulting projected image is dark.

In addition, the optical system limits the luminous fluxes at a position closer to the light source than a color separation optical system, so that it cannot limit the luminous fluxes in association with wavelengths and hence is not effective in improving black color and black unevenness in a black display state.

BRIEF SUMMARY OF THE INVENTION

The present invention provides a color separation optical system which is effective in improving black color and black unevenness and is capable of reducing a decrease in the amount of light, and an image projection apparatus using the same.

According to one aspect, the present invention provides a color separation optical system including a dichroic surface which transmits light from a light source in a first wavelength band and reflects light therefrom in a wavelength band longer than the first wavelength band, and a polarization beam splitting surface on which the light transmitted through the dichroic surface impinges.

When linearly polarized light impinging on the dichroic surface at an incident angle smaller than 45 degrees and then impinging on the polarization beam splitting surface at an incident angle larger than 45 degrees in an optical path for the light in the first wavelength band is referred to as first incident-angle light, a wavelength which is longer than a wavelength at the maximum transmittance of the dichroic surface for the first incident-angle light and at which the transmittance of the dichroic surface for the first incident-angle light is 10% is referred to as a wavelength Wa, and a range of wavelengths shorter than the wavelength Wa is referred to as a wavelength range W, the polarization beam splitting surface has a characteristic in which its transmittance for the first incident-angle light in the wavelength range W is equal to or lower than 5%.

According to another aspect, the present invention provides a color separation optical system including a dichroic surface which transmits light from a light source in a first wavelength band and reflects light therefrom in a wavelength band longer than the first wavelength band, and a polarization beam splitting surface on which the light transmitted through the dichroic surface impinges.

When linearly polarized light impinging on the dichroic surface at an incident angle smaller than 45 degrees and then impinging on the polarization beam splitting surface at an incident angle larger than 45 degrees in an optical path for the light in the first wavelength band is referred to as first incident-angle light, a wavelength which is longer than a wavelength at the maximum transmittance of the dichroic surface for the first incident-angle light and at which the transmittance of the dichroic surface for the first incident-angle light is 10% is referred to as a wavelength Wa, and a range of wavelengths shorter than the wavelength Wa is referred to as a wavelength range W, the polarization beam splitting surface has a characteristic in which its reflectance for the first incident-angle light in the wavelength range W is equal to or lower than 5%.

Other objects and features of the present invention will be apparent from the following description of preferred embodiments with reference to the accompanying drawings.

DETAILED DESCRIPTION OF THE PREFERRED EMBODIMENTS

Preferred embodiments of the present invention will hereinafter be described with reference to the drawings.

Embodiment 1

Figure 1:
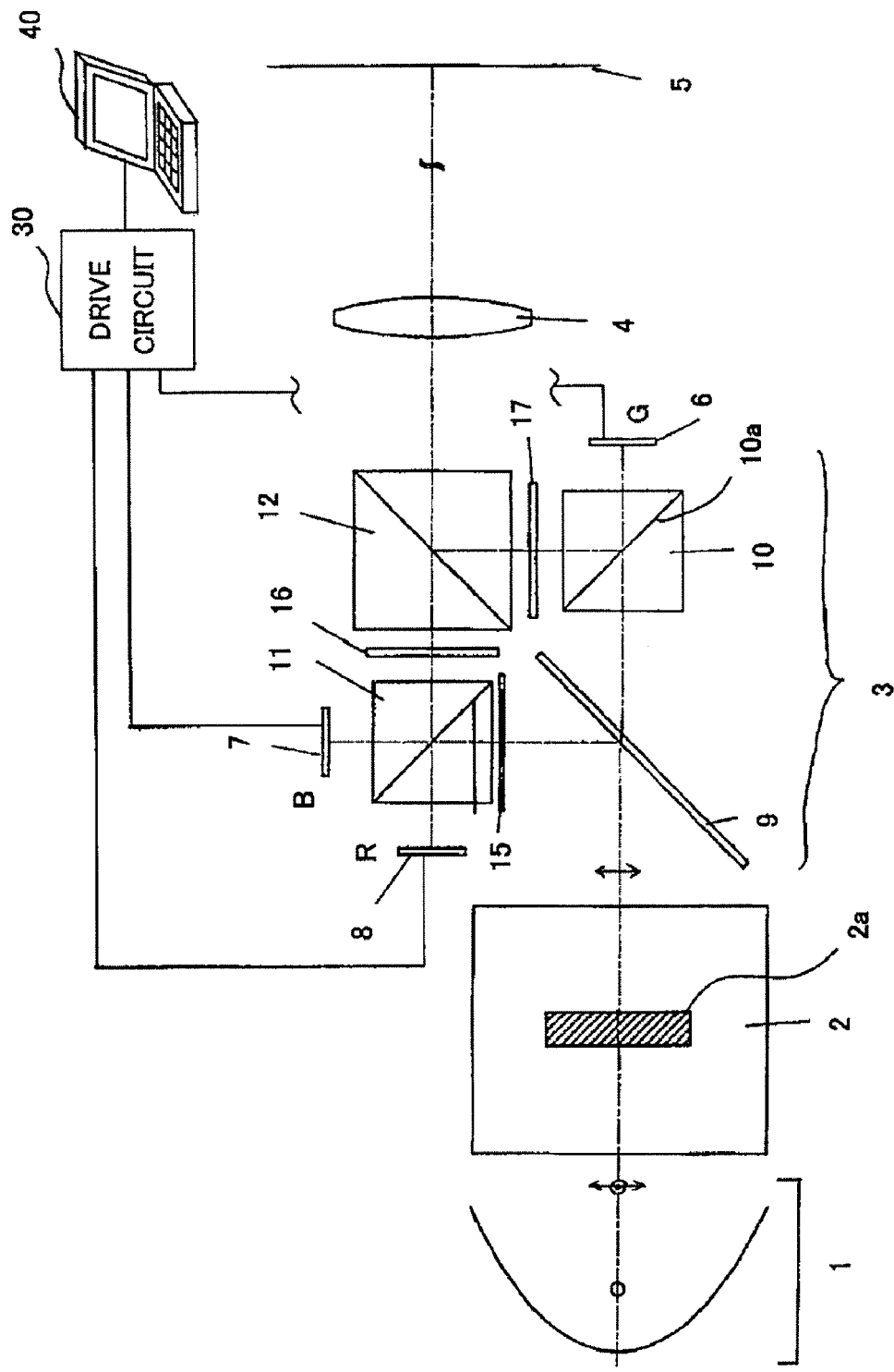
FIG. 1 is a schematic diagram showing the structure of a liquid crystal projector which is Embodiment 1 of the present invention.

FIG. 1 shows the structure of a liquid crystal projector which is Embodiment 1 of the present invention. The projector of Embodiment 1 includes a light source 1 formed of an arc tube and a reflector, an illumination optical system 2, a color separation/combination optical system 3 serving as a color separation optical system, reflective liquid crystal panels 6, 7, and 8 serving as light modulation elements or image forming elements, and a projection lens 4. The illumination optical system 2, the color separation/combination optical system 3, the reflective liquid crystal panels 6, 7, and 8, and the projection lens 4 constitute an image display optical system. This is also applied to Embodiment 2, later described.

The illumination optical system 2 directs light from the light source 1 to the color separation/combination optical system 3.

The color separation/combination optical system 3 divides white color from the illumination optical system 2 into light of red (R light at a wavelength range from 600 to 650 nm, for example), light of green (G light at a wavelength range from 500 to 600 nm, for example), and light of blue (B light at a wavelength range from 440 to 500 nm, for example), and directs them to the corresponding reflective liquid crystal panels. The color separation/combination optical system 3 combines the R light, G light, and B light from the three reflective liquid crystal panels 6, 7, and 8 and directs the combined light to the projection lens 4.

The reflective liquid crystal panels 6, 7, and 8 are connected to a liquid crystal drive circuit 30 which in turn is connected to an image supply apparatus 40 such as a personal computer, a DVD player, and a television tuner. The liquid crystal drive circuit 30 drives the respective reflective liquid crystal panels based on image (video) information input thereto from the image supply apparatus 40 and causes the panels to form original images for the respective colors. Thus, the light entering each of the reflective liquid crystal panels is reflected and modulated (image-modulated) in accordance with the original image. The liquid crystal projector and the image supply apparatus 40 constitute an image display system. This is also applied to Embodiment 2, later described.

The projection lens 4 projects the combined light from the reflective liquid crystal panels 6, 7, and 8 toward a screen (projection surface) 5.

The light emitted from the light source 1 is non-polarized light, but is converted into P-polarized light by a polarization conversion element 2a included in the illumination optical system 2.

The color separation/combination optical system 3 includes a dichroic mirror 9 and three polarization beam splitters 10, 11, and 12. In the following description, the polarization beam splitters 10 and 11 are referred to as a G-PBS and an RB-PBS, respectively. The polarization beam splitter 12 which performs color combination is referred to as a combination PBS.

The dichroic mirror 9 is provided by forming a dichroic film (dichroic surface) formed of a multilayer film on a glass substrate. The dichroic mirror 9 reflects the R light and B light of the white light from the illumination optical system 2 and transmits the G light thereof to separate the optical paths of the R light and the B light from the optical path of the G light. In other words, the dichroic mirror 9 transmits the G light and reflects the R light having a longer wavelength than that of the G light.

Each of the polarization beam splitters (PBS) is provided by forming a polarization beam splitting film (that is, a polarization beam splitting surface) formed of a multilayer film on an interface between two bonded glass blocks each having the shape of a triangular prism.

Figure 2:
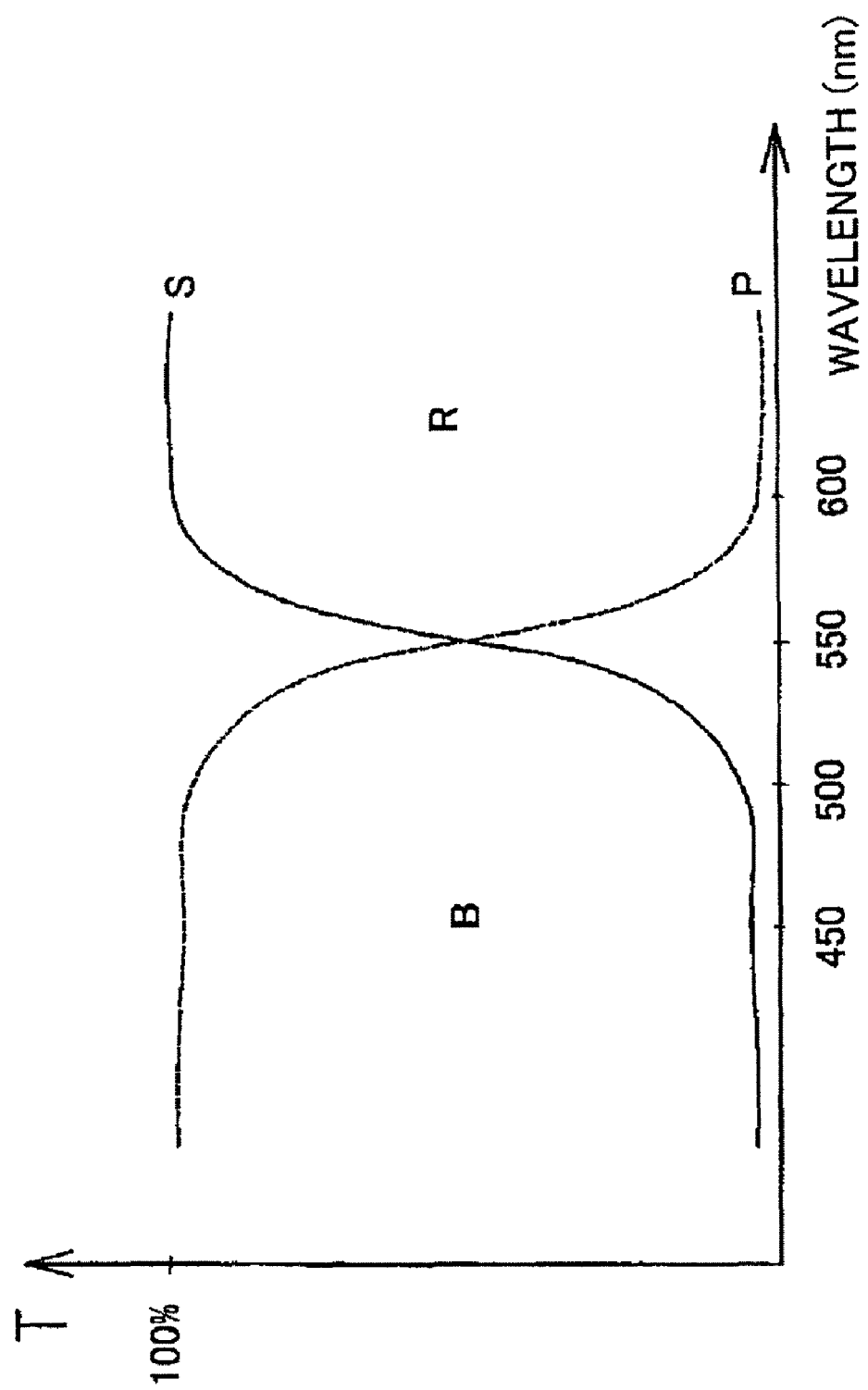
FIG. 2 is a graph showing the characteristic of a wavelength-selective phase plate in Embodiment 1.

A wavelength-selective phase plate 15 is provided on the optical paths of the R light and B light for separating the R light and the B light which are reflected by the dichroic mirror 9. The wavelength-selective phase plate 15 has a characteristic shown in FIG. 2 for P-polarized light and S-polarized light (T represents the transmittance). In FIG. 2, the solid line represents the transmittance for S-polarized light, while the dotted line represents the transmittance for P-polarized light. The R light that is P-polarized light is converted into S-polarized light by the wavelength-selective phase plate 15, but the B light remains as P-polarized light.

The R light transmitted through the wavelength-selective phase plate 15 enters the RB-PBS 11 as S-polarized light and is then reflected by the polarization beam splitting surface of the RB-PBS 11 toward the reflective liquid crystal panel 8 for R (hereinafter referred to as the R panel, the other liquid crystal panels 6 and 7 for G and B are referred to as the G panel and the B panel, respectively). The R light is image-modulated by the R panel 8 to be changed into P-polarized light and is then transmitted through the polarization beam splitting surface of the RB-PBS 11 to reach the combination PBS 12.

The B light enters the RB-PBS 11 as P-polarized light and is then transmitted through the polarization beam splitting surface of the RB-PBS 11 toward the B panel 7. The B light is image-modulated by the B panel 7 to be changed into S-polarized light and is then reflected by the polarization beam splitting surface of the RB-PBS 11 to reach the combination PBS 12.

Figure 3:
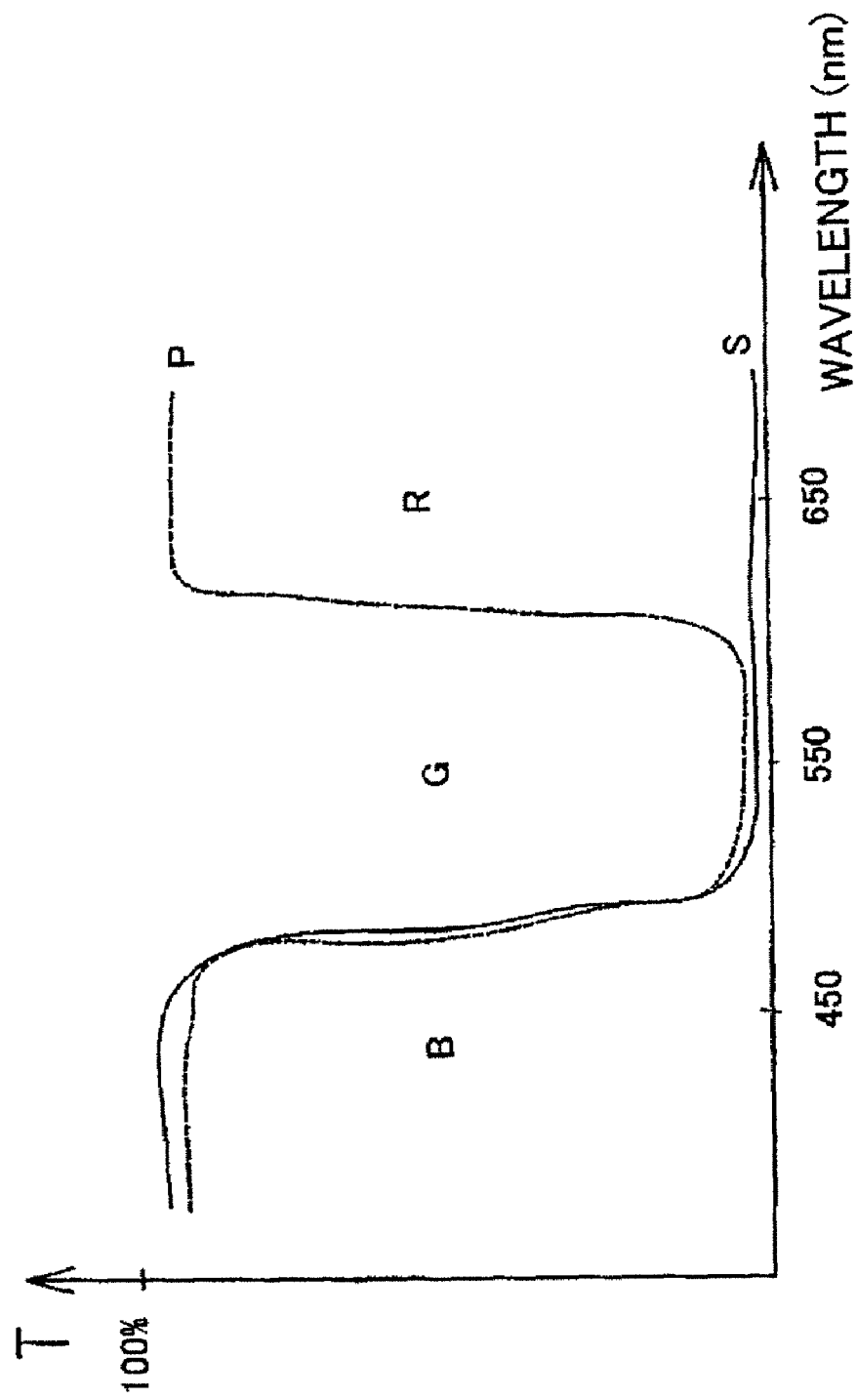
FIG. 3 is a graph showing the characteristic of a combination PBS in Embodiment 1.

The combination PBS 12 has a characteristic shown in FIG. 3. In FIG. 3, the solid line represents the transmittance for S-polarized light, while the dotted line represents the transmittance for P-polarized light. The polarization beam splitting surface of the combination PBS 12 has a polarization beam splitting function for the R light and a dichroic function for the B light and the G light.

A polarizing plate 16 for analyzing the B light is placed between the combination PBS 12 and the RB-PBS 11. The B light analyzed by the polarizing plate 16 enters the combination PBR 12 and is then transmitted through the polarization beam splitting surface thereof to reach the projection lens 4. The R light is analyzed by the polarization beam splitting surface of the combination PBS 12 having the analyzing characteristic shown in FIG. 3 and is transmitted through the polarization beam splitting surface to reach the projection lens 4.

On the other hand, the G light transmitted through the dichroic mirror 9 is P-polarized light, which is then transmitted through a polarization beam splitting surface 10a of the G-PBS 10 to reach the G panel 6. The G light is image-modulated by the G panel 6 to be changed into S-polarized light and is then reflected by the polarization beam splitting surface 10a of the G-PBS 10 to reach the combination PBS 12.

A polarizing plate 17 for analyzing the G light is placed between the combination PBS 12 and the G-PBS 10. The G light analyzed by the polarizing plate 17 is reflected by the polarization beam splitting surface of the combination PBS 12 to be directed toward the projection lens 4.

Figure 4:
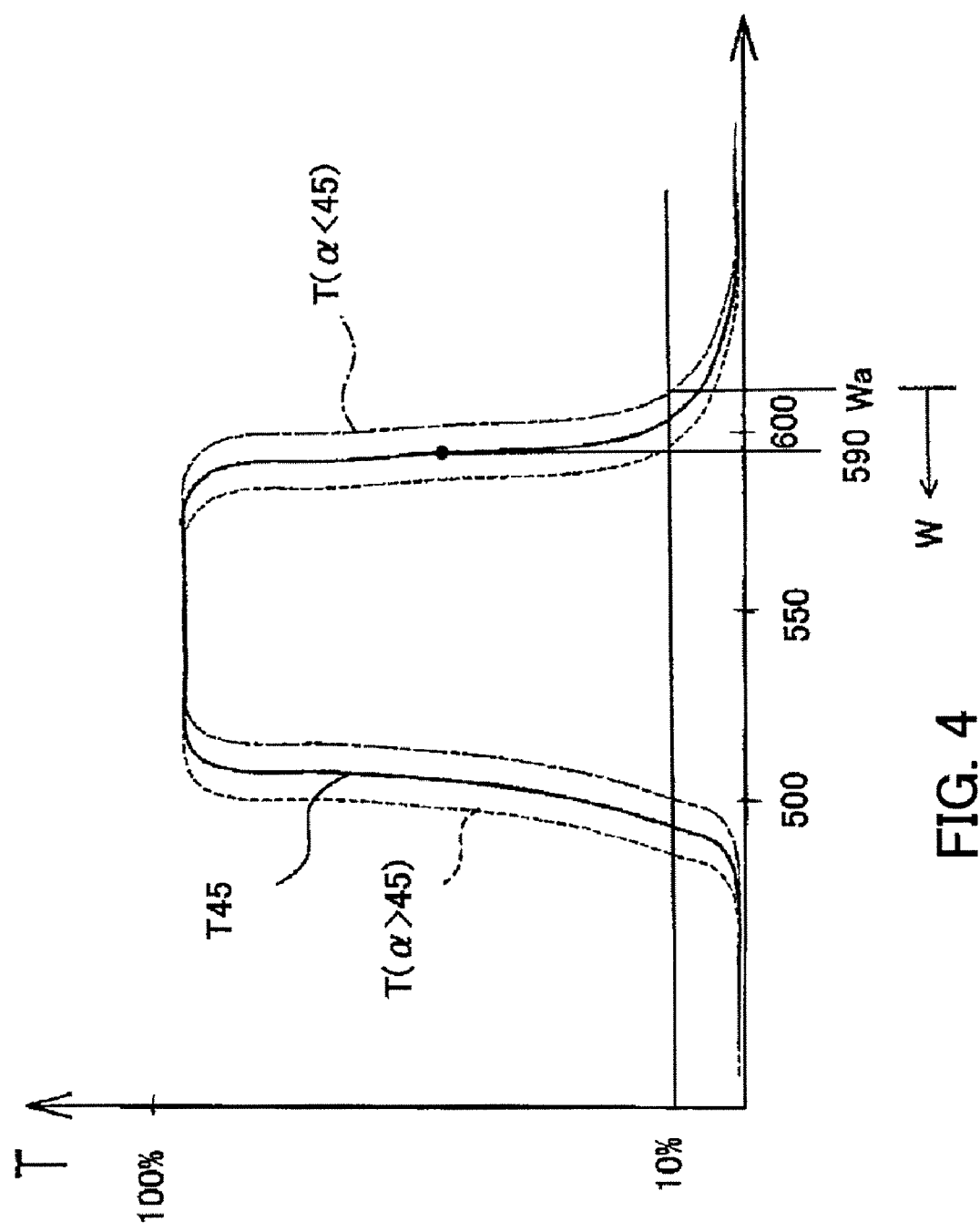
FIG. 4 is a graph showing the transmittance of a dichroic mirror in Embodiment 1.

FIG. 4 shows the characteristic of the dichroic mirror 9 in this embodiment 1. In FIG. 4, the solid line represents the transmittance ($T_{45}$) for a light ray (or light) at an incident angle α of 45 degrees, while the dotted line represents the transmittance ($T_{(\alpha>45)}$) for a light ray at an incident angle α larger than 45 degrees. The dash dotted line represents the transmittance ($T_{(\alpha<45)}$) for a light ray at an incident angle α smaller than 45 degrees. The incident angle means an angle with respect to the normal to the surface on which light impinges. The dichroic mirror 9 has a cut wavelength (wavelength with a transmittance of 50%) of approximately 590 nm on the long wavelength side for the light ray at an incident angle of 45 degrees.

It is shown from FIG. 4 that the curve representing the transmittance for the light ray at an incident angle α smaller than 45 degrees is generally shifted toward the long wavelength side relative to the curve representing the transmittance for the light ray at an incident angle α of 45 degrees. The curve representing the transmittance for the light ray at an incident angle α larger than 45 degrees is shifted toward the short wavelength side. A first wavelength band corresponds to a wavelength band in which the dichroic mirror 9 has a transmittance of at least 10% for the light ray at an incident angle α smaller than 45 degrees. Thus, the optical path of the G light includes some light in a wavelength band longer than the wavelength band of the G light illustrated above. This is also applied to Embodiment 2, later described.

Figure 5:
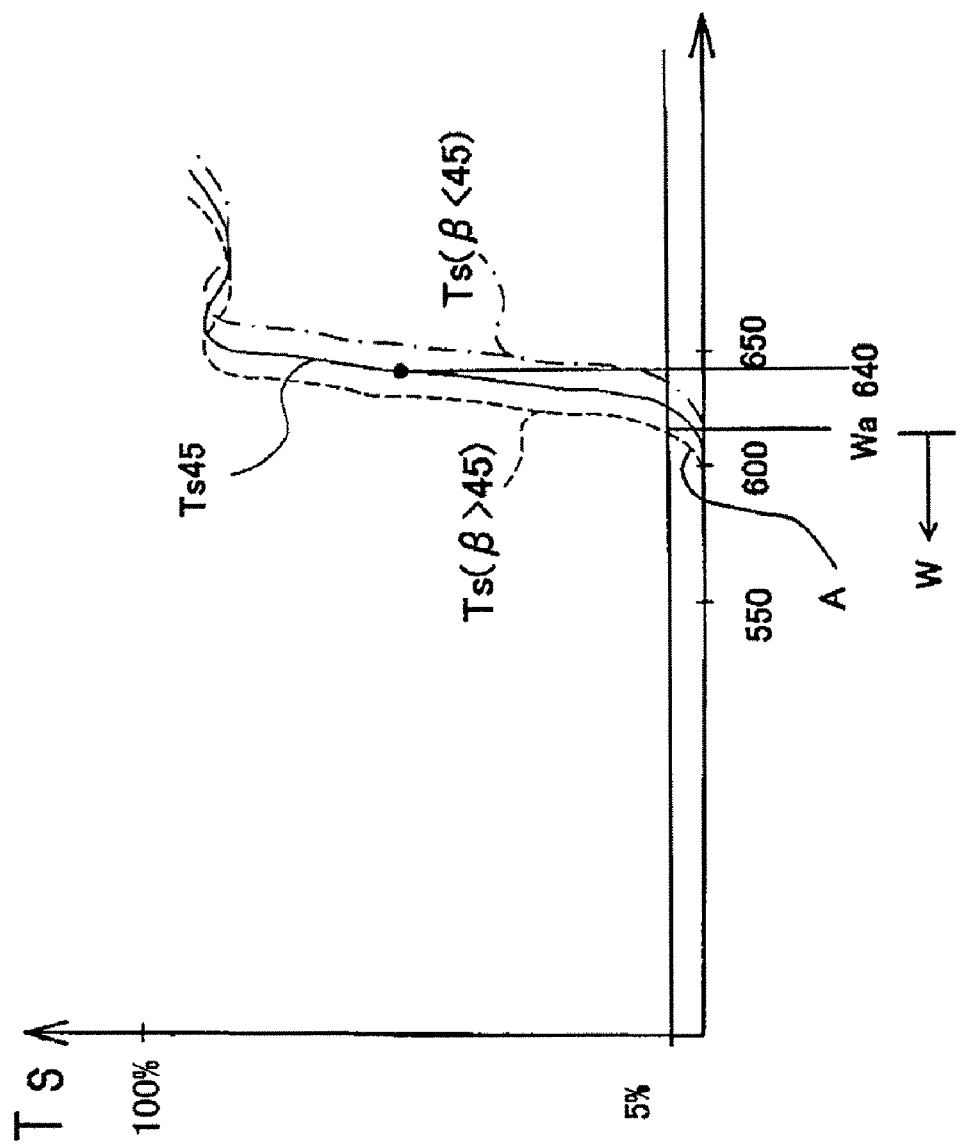
FIG. 5 is a graph showing the transmittance of a G-PBS for S-polarized light in Embodiment 1.

FIG. 5 shows the transmittance characteristic of the polarization beam splitting surface 10a of the G-PBS 10 for S-polarized light. In FIG. 5, the solid line represents the transmittance ($Ts_{45}$) for S-polarized light at an incident angle β of 45 degrees, while the dash dotted line represents the transmittance ($Ts_{(\beta<45)}$) for S-polarized light at an incident angle β smaller than 45 degrees. A dotted line represents the transmittance ($Ts_{(\beta>45)}$) for S-polarized light at an incident angle β larger than 45 degrees.

It is shown from FIG. 5 that the curve representing the transmittance for S-polarized light at an incident angle β larger than 45 degrees is generally shifted toward the short wavelength side relative to the curve representing the transmittance for S-polarized light at an incident angle β of 45 degrees in the polarization beam splitting surface 10a of the G-PBS 10. The curve representing the transmittance for S-polarized light at an incident angle β smaller than 45 degrees is shifted toward the long wavelength side.

Figure 6:
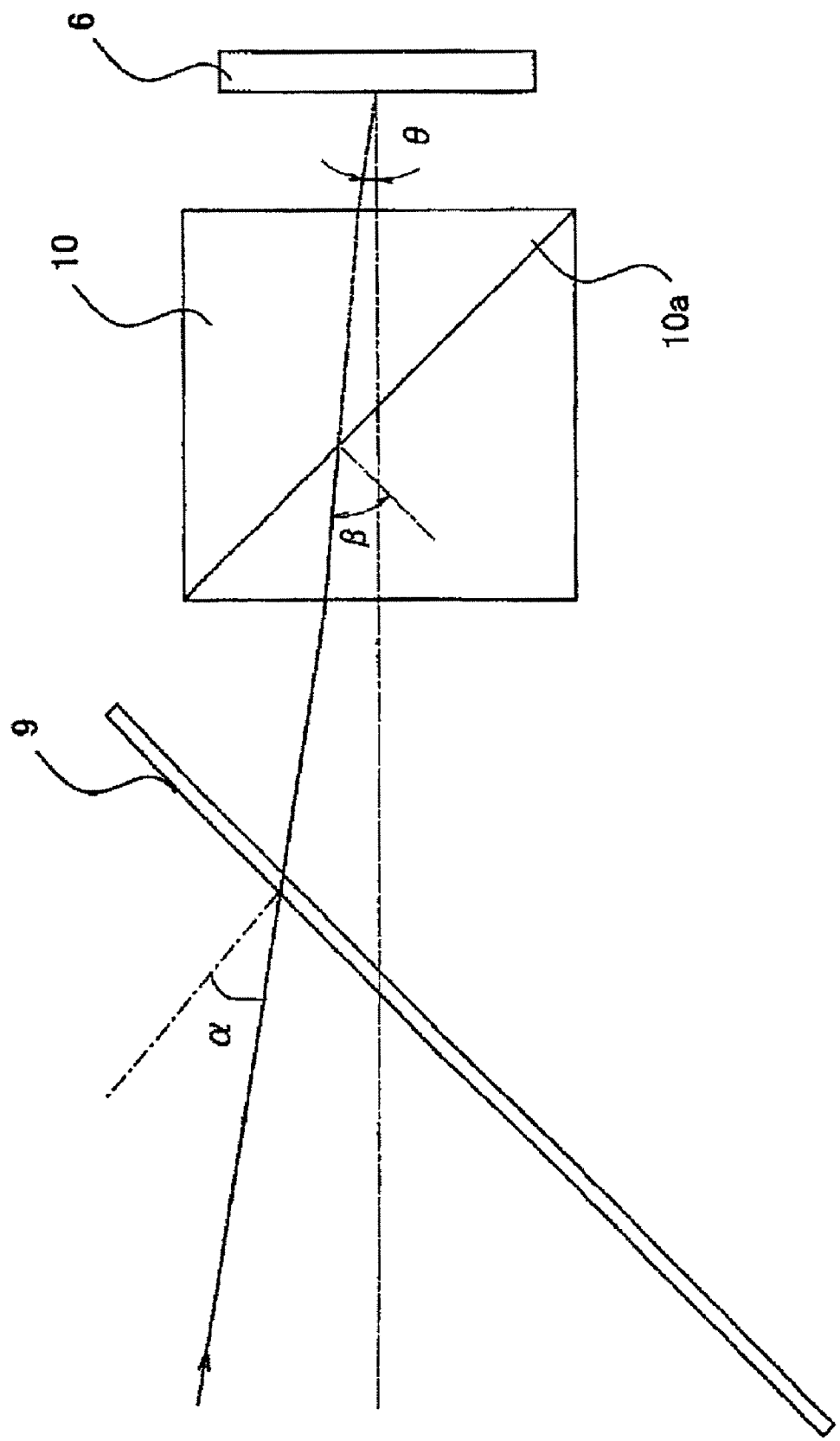
FIG. 6 shows the optical path from the dichroic mirror to a G panel in Embodiment 1.

As shown in FIG. 6, when a light ray enters the dichroic mirror 9 at an incident angle α smaller than 45 degrees, the light ray enters the polarization beam splitting surface 10a of the G-PBS 10 at an incident angle β larger than 45 degrees.

In this embodiment, most of the light entering the color separation/combination optical system 3 is P-polarized light. In reality, however, the light contains a small amount of S-polarized light that could not be converted by the polarization conversion element 2a. If the small amount of S-polarized light contained in the optical path of the G light enters the G-PBS 10, the S-polarized light at longer wavelengths in the optical path of the G light is transmitted through the polarization beam splitting surface 10a of the G-PBS 10 based on the transmittance characteristic for S-polarized light shown in FIG. 5.

The S-polarized light in the optical path of the G light transmitted through the polarization beam splitting surface 10a of the G-PBS 10 enters the G panel 6. The S-polarized light is not image-modulated in a black display state, so that it emerges from the G panel 6 as S-polarized light. The light is reflected by the polarization beam splitting surface 10a of the G-PBS 10 toward the combination PBS 12 and passes through the projection lens 4 to reach the screen 5. That light, called leakage light, generated in the optical path of the G light degrades black color of projected images or increases black unevenness thereof in the black display state to reduce the contrast.

In FIG. 6, the incident angle β of a light ray on the polarization beam splitting surface 10a of the G-PBS 10 is represented as the following expression:

$$\beta = 45° + \mathrm{Sin}^{-1}\left(\frac{1}{n}\sin\theta\right) \quad (1)$$

where θ represents the incident angle of the light ray on the G panel 6.

In this embodiment, the characteristic of the polarization beam splitting surface 10a of the G-PBS 10 is set to satisfy the following expression:

$$Ts(\beta) \leq 5\% \quad (2)$$

where Ts(β) represents the transmittance of the polarization beam splitting surface 10a of the G-PBS 10 for S-polarized light at an incident angle of β.

Referring again to FIG. 6, S-polarized light impinging the dichroic mirror 9 at an incident angle α smaller than 45 degrees and then impinging the polarization beam splitting surface 10a of the G-PBS 10 at an incident angle β larger than 45 degrees in the optical path of the G light is referred to as first incident-angle light. Referring back to FIG. 4, in the optical path of the G light, Wa represents the wavelength which is longer than the wavelength at the maximum transmittance of the dichroic mirror 9 for the first incident-angle light and at which the transmittance of the dichroic mirror 9 for the first incident-angle light is 10%. A range of wavelengths shorter than the wavelength Wa is referred to as W.

In this case, the polarization beam splitting surface 10a has the characteristic in which the transmittance for the first incident-angle light (S-polarized light) in the wavelength range W is equal to or lower than 5%. In FIG. 5, a portion A shows the transmittance equal to or lower than 5%.

Figure 10:
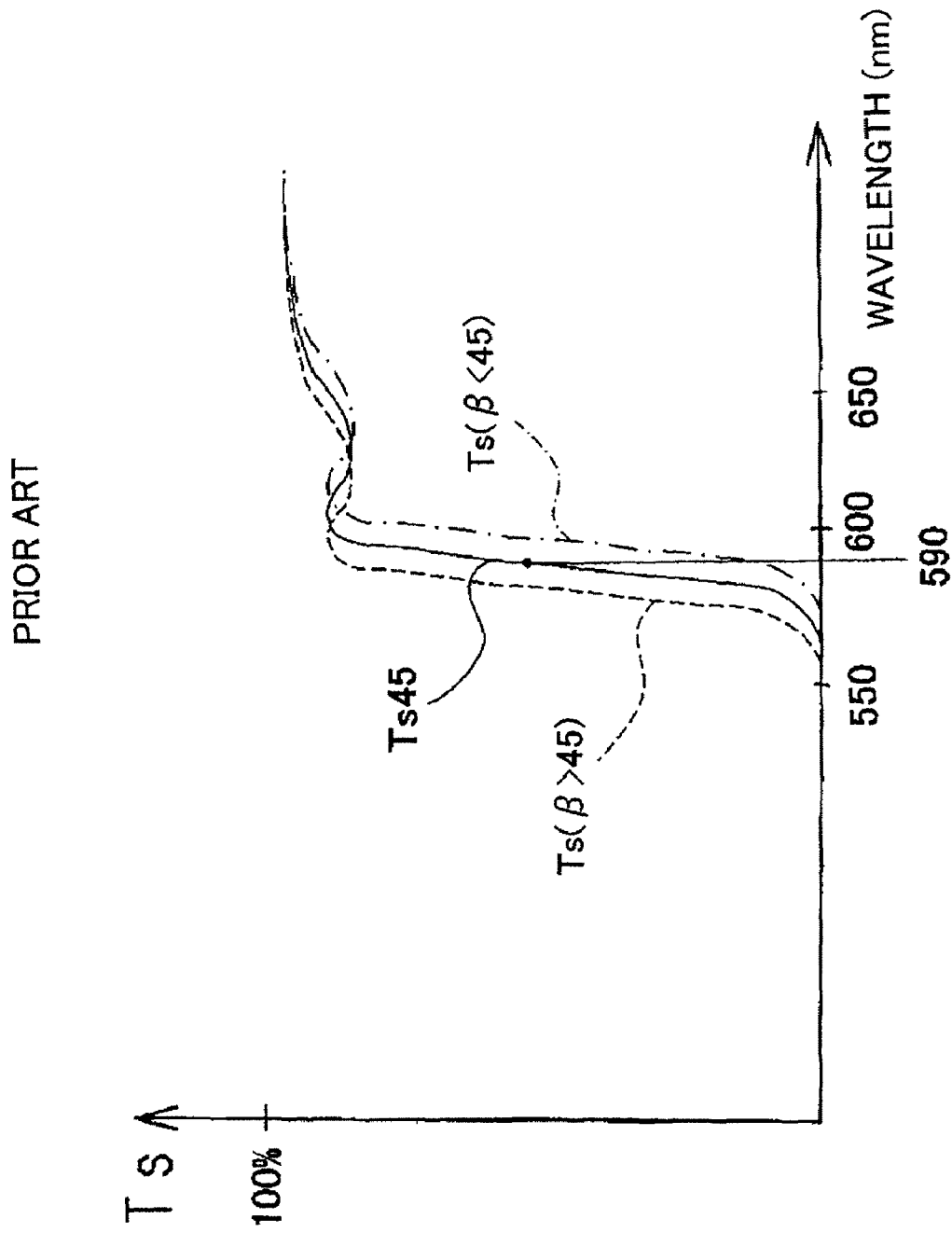
FIG. 10 is a graph showing the transmittance of a conventional G-PBS for S-polarized light.

FIG. 10 shows the transmittance characteristic of a polarization beam splitting surface of a conventional G-PBS for S-polarized light. In FIG. 10, the solid line represents the transmittance for S-polarized light at an incident angle of 45 degrees, while the dotted line represents the transmittance for S-polarized light at an incident angle larger than 45 degrees. The dash dotted line represents the transmittance for S-polarized light at an incident angle smaller than 45 degrees.

In FIG. 10, the conventional G-PBS has a cut wavelength (wavelength with a transmittance of 50%) of approximately 590 nm for S-polarized light at an incident angle of 45 degrees on the polarization beam splitting surface. In contrast, as shown in FIG. 5, the G-PBS 10 of Embodiment 1 has a cut wavelength of approximately 640 nm for S-polarized light at an incident angle of 45 degrees on the polarization beam splitting surface 10a. In other words, in Embodiment 1, the cut wavelength for S-polarized light at an incident angle of 45 degrees on the polarization beam splitting surface 10a is shifted toward the long wavelength side as compared with the cut wavelengths (both are approximately 590 nm) for S-polarized light at an incident angle of 45 degrees on the conventional polarization beam splitting surface and the dichroic mirror 9. This realizes the characteristic which satisfies the abovementioned expression (2).

According to this embodiment, S-polarized light impinging the dichroic mirror 9 at an incident angle α smaller than 45 degrees and transmitted through the dichroic mirror 9 in the optical path of the G light is transmitted through the polarization beam splitting surface 10a of the G-PBS 10 only at a transmittance of 5% or lower. Thus, even when any polarizing plate is not provided on the entrance side of the G-PBS 10, only an extremely small amount of S-polarized light enters the G panel 6 in the black display state. As a result, black color and black unevenness can be improved to enhance the contrast of projected images. Since the polarization beam splitting surface 10a of the G-PBS 10 is responsible for the function of the polarizing plate in this embodiment, the polarizing plate conventionally placed on the entrance side of the G-PBS is not required. This can reduce the cost and avoid possible disadvantages due to degradation of the polarizing plate.

Embodiment 2

Figure 7:
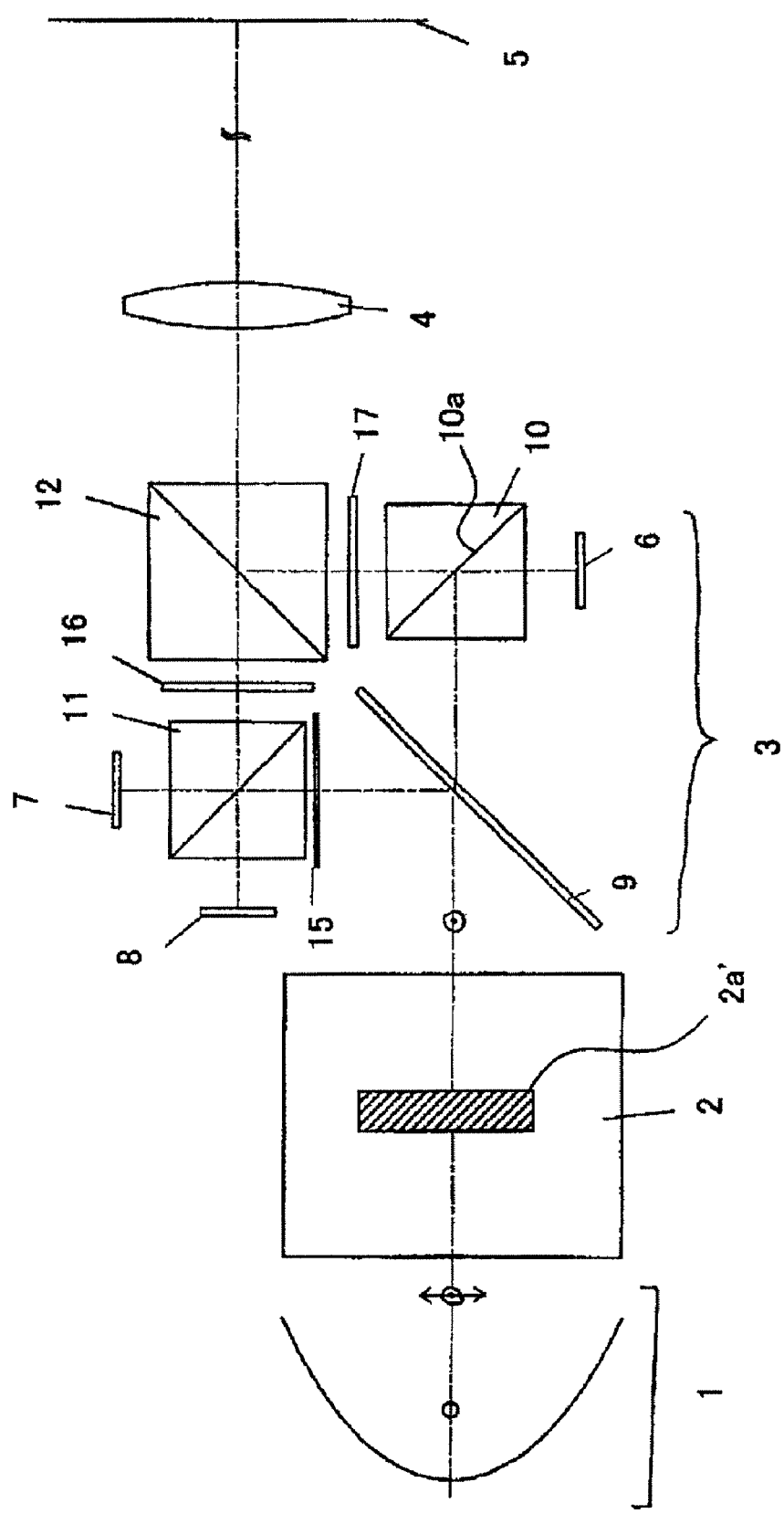
FIG. 7 is a schematic diagram showing the structure of a liquid crystal projector which is Embodiment 2 of the present invention.

FIG. 7 shows the structure of a liquid crystal projector which is Embodiment 2 of the present invention. Since the liquid crystal projector has the same basic structure as that of the liquid crystal projector of Embodiment 1, components identical to those in Embodiment 1 are designated with the same reference numerals.

In Embodiment 2, however, S-polarized light emerges from an illumination optical system 2 (polarization conversion element 2a').

In Embodiment 2, a dichroic mirror 9 separates R light and B light from G light as in Embodiment 1. In Embodiment 2, however, a wavelength-selective phase plate 15 is used to change the polarization state of B light from S-polarized light into P-polarized light while R light remains as S-polarized light. The other optical actions on the R light and the B light are similar to those in Embodiment 1.

In an optical path of the G light, the G light transmitted through the dichroic mirror 9 enters a G-PBS 10 as S-polarized light and is then reflected by a polarization beam splitting surface 10a of the G-PBS 10 to enter a G panel 6. The G light is image-modulated by the G panel 6 to be changed into P-polarized light and is then transmitted through the polarization beam splitting surface 10a of the G-PBS 10 to be directed toward a combination PBS 12.

The G light that emerged from the G-PBS 10 is analyzed by a polarizing plate 17 provided between the G-PBS 10 and the combination PBS 12 and is reflected by a polarization beam splitting surface of the combination PBS 12 toward a projection lens 4 to reach a screen 5. The combination PBS 12 has a characteristic similar to that of Embodiment 1.

Figure 8:
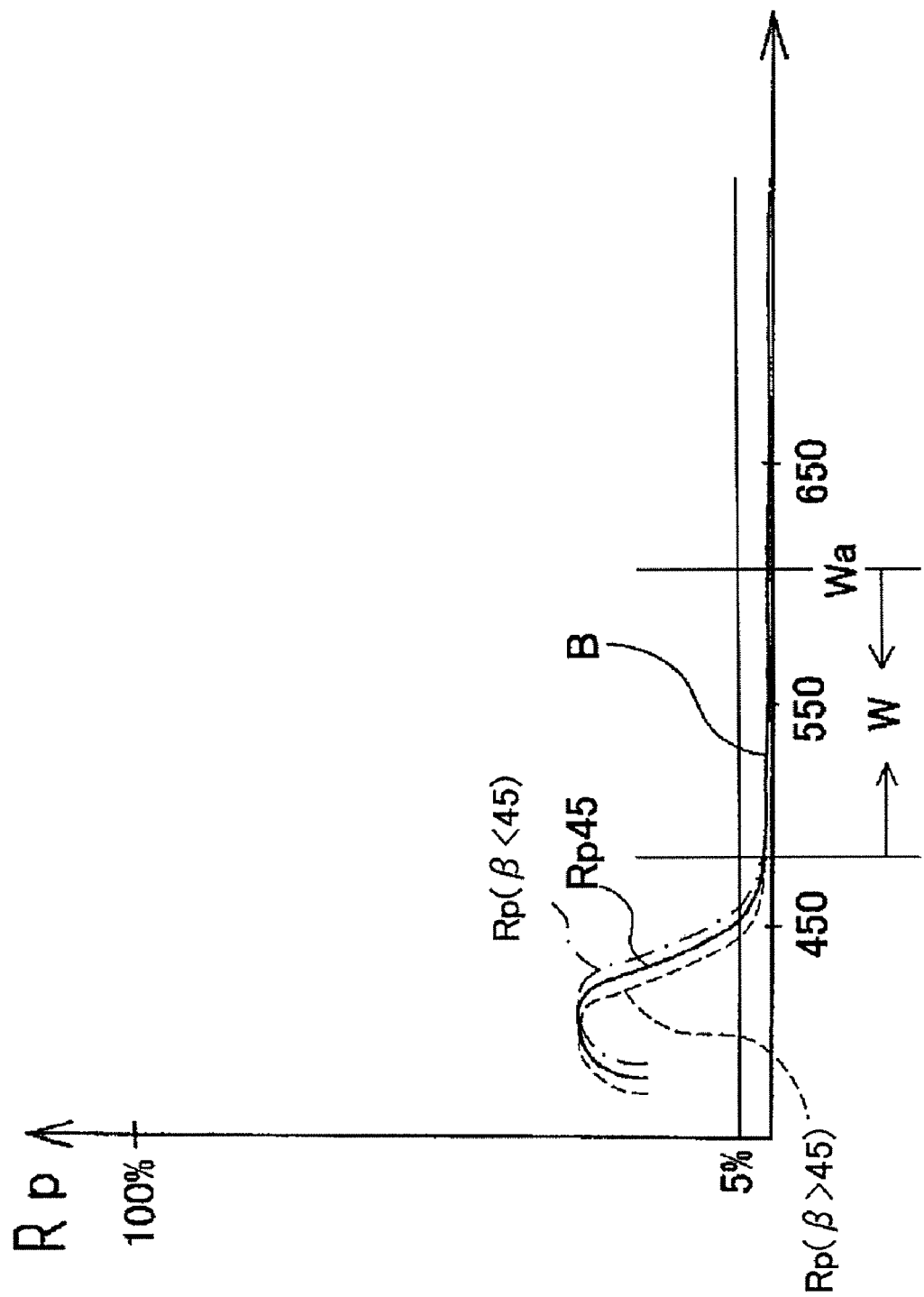
FIG. 8 is a graph showing the reflectance of a G-PBS for P-polarized light in Embodiment 2.

FIG. 8 is a graph showing the reflectance characteristic of the polarization beam splitting surface 10a of the G-PBS 10 for P-polarized light in this embodiment. On the polarization beam splitting surface 10a of the G-PBS 10, the curve shown by the dotted line and representing the reflectance ($Rp_{(\beta>45)}$) for P-polarized light at an incident angle larger than 45 degrees is generally shifted toward the short wavelength side relative to the curve shown by the solid line and representing the reflectance ($Rp_{45}$) for P-polarized light at an incident angle of 45 degrees. The curve shown by the dash dotted line and representing the reflectance ($Rp_{(\beta<45)}$) for P-polarized light at an incident angle smaller than 45 degrees is shifted toward the long wavelength side.

Most of the light emerging from the illumination optical system 2 is S-polarized light. In reality, however, the light contains a small amount of P-polarized light. Although most of the P-polarized light is transmitted through the polarization beam splitting surface 10a of the G-PBS 10 in the optical path of the G light, but in reality some of the light at shorter wavelengths is reflected as shown in FIG. 8.

Figure 9:
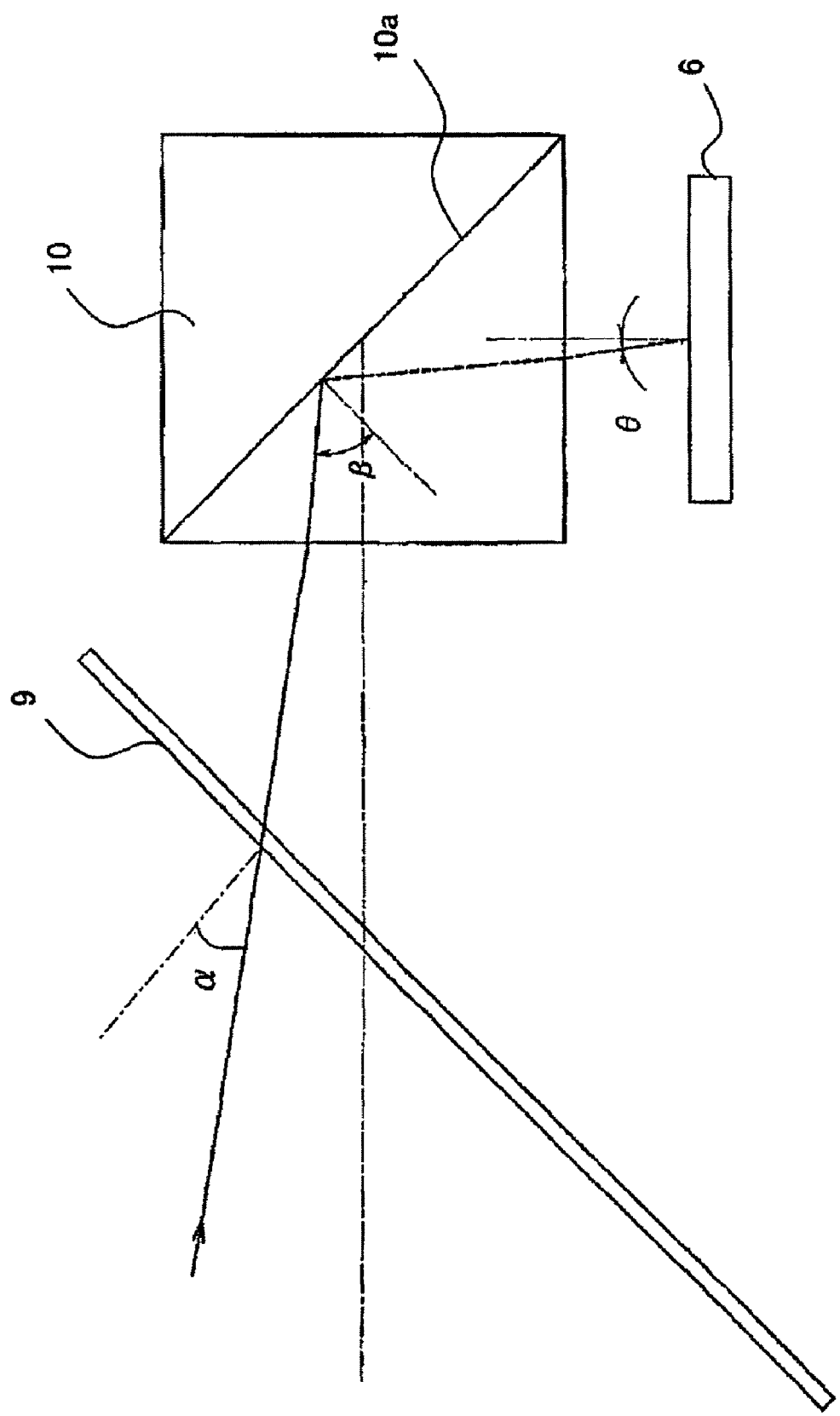
FIG. 9 shows the optical path from a dichroic mirror to a G panel in Embodiment 2.

As shown in FIG. 9, the incident angle β of a light ray (light) on the polarization beam splitting surface 10a of the G-PBS 10 is represented by the abovementioned expression (1) when θ represents the incident angle θ of the light ray on the G panel 6.

In Embodiment 2, the characteristic of the polarization beam splitting surface 10a of the G-PBS 10 is set to satisfy the following expression (3):

$$Rp(\beta) \leq 5\% \qquad (3)$$

where Rp(β) represents the reflectance for P-polarized light on the polarization beam splitting surface 10a of the G-PBS 10 at an incident angle β.

Referring again to FIG. 9, P-polarized light impinging the dichroic mirror 9 at an incident angle α smaller than 45 degrees and then impinging the polarization beam splitting surface 10a of the G-PBS 10 at an incident angle β larger than 45 degrees in the optical path of the G light is referred to as the first incident-angle light. Referring back to FIG. 4, in the optical path of the G light, Wa represents the wavelength which is longer than the wavelength at the maximum transmittance of the dichroic mirror 9 for the first incident-angle light and at which the transmittance of the dichroic mirror 9 for the first incident-angle light is 10%. The range of wavelengths shorter than the wavelength Wa is referred to as W.

In this case, the polarization beam splitting surface 10a has the characteristic in which the reflectance for the first incident-angle light (P-polarized light) in the wavelength range W is equal to or lower than 5%. In FIG. 8, a portion B shows the reflectance equal to or lower than 5%. The light components at wavelengths shorter than the shortest wavelength in the wavelength range W are not considered in this case since they are removed by the dichroic mirror 9.

In this embodiment, the curve representing the characteristic for P-polarized light at an incident angle of 45 degrees on the polarization beam splitting surface 10a is shifted toward the short wavelength side as compared with the curve representing the characteristic for S-polarized light at an incident angle of 45 degrees on the conventional polarization beam splitting surface and the dichroic mirror 9. This realizes the characteristic which satisfies the abovementioned expression (3).

According to this embodiment, P-polarized light impinging on the dichroic mirror 9 at an incident angle α smaller than 45 degrees and transmitted through the dichroic mirror 9 in the optical path of the G light is then reflected by the polarization beam splitting surface 10a of the G-PBS 10 only at a reflectance of 5% or lower. Thus, even when any polarizing plate is not provided on the entrance side of the G-PBS 10, leakage light in the black display state can be reduced to improve black color and black unevenness to enhance the contrast of projected images. Since any polarizing plate is not required, the cost can be reduced and possible disadvantages due to degradation of the polarizing plate can be avoided.

As described above, according to Embodiments 1 and 2, black color and black unevenness in the black display state can be improved to enhance the contrast of projected images without significantly reducing the amount of light. In addition, the polarization beam splitting surface can have the function as a polarizing plate to eliminate the need for the polarizing plate which has conventionally been required on the entrance side of the polarization beam splitting surface.

While Embodiments 1 and 2 described the projector with the reflective liquid crystal panel, other light modulation elements or image forming elements may be used such as a transmissive liquid crystal panel and a DMD (digital micro mirror device).

While Embodiments 1 and 2 have been described in conjunction with the dichroic mirror 9 which reflects the G light and transmits the R light and B light, this is merely illustrative. In other words, any other color separation optical systems, for example, a color separation optical system in which a dichroic mirror transmits B light and reflects G light having a longer wavelength than that of the B light can be used.

Furthermore, the present invention is not limited to these preferred embodiments and various variations and modifications may be made without departing from the scope of the present invention.

This application claims foreign priority benefits based on Japanese Patent Application No. 2006-032415, filed on Feb. 9, 2006, which is hereby incorporated by reference herein in its entirety as if fully set forth herein.

What is claimed is:

1. A color separation optical system comprising:
   a dichroic surface that transmits light from a light source in a green wavelength band and reflects light in a red wavelength band and a blue wavelength band;
   a polarization beam splitting surface that transmits the light transmitted through the dichroic surface;
   a light modulation element that receives the light transmitted through the polarization beam splitting surface, modulates the received light, and reflects the modulated light or non-modulated light back to the polarization beam splitting surface; and
   a polarization plate that analyzes the modulated light reflected by the light modulation element,
   wherein the polarization beam splitting surface reflects the modulated light received from the light modulation element to the polarization plate,
   wherein, when S-polarized light impinging on the dichroic surface at an incident angle smaller than 45 degrees and then impinging on the polarization beam splitting surface at an incident angle larger than 45 degrees in an optical path for the light in the green wavelength band is referred to as first incident-angle light, a wavelength which is longer than a wavelength at the maximum transmittance of the dichroic surface for the first incident-angle light and at which the transmittance of the dichroic surface for the first incident-angle light is 10% is referred to as a wavelength Wa, and a range of wavelengths shorter than the wavelength Wa is referred to as W,
   wherein the polarization beam splitting surface has a characteristic in which its transmittance for the first incident-angle light in the wavelength range W is equal to or lower than 5%, and
   wherein a wavelength with a transmittance of 50% for the S-polarized light at an incident angle of 45 degrees on the polarization beam splitting surface is between 600 nm and 650 nm.

2. The color separation optical system according to claim 1, wherein the polarization beam splitting surface has a cut wavelength for the first incident-angle light longer than a cut wavelength of the dichroic surface for the first incident angle light.

3. The color separation optical system according to claim 1, wherein the wavelength with the transmittance of 50% for the S-polarized light at the incident angle of 45 degrees on the polarization beam splitting surface is approximately 640 nm.

4. An image display optical system comprising:
   the color separation optical system according to claim 1; and
   a projection optical system that projects the light from the light modulation element passing through the polarization plate.

5. An image projection apparatus comprising:
   a light source; and
   the image display optical system according to claim 4.

6. An image display system comprising:
   the image projection apparatus according to claim 5; and
   an image supply apparatus that supplies image information to the image projection apparatus.

7. The image projection apparatus according to claim 5, wherein:
   the light modulation element is used for light of the green wavelength band,
   the polarization beam splitting surface is a first polarization beam splitting surface arranged between the dichroic surface and the light modulation element for light of the green wavelength band,
   the color separation optical system further comprises:
      a modulation element for light of the blue wavelength band;
      a modulation element for light of the red wavelength band;
      a second polarization beam splitter arranged between the dichroic surface and the light modulation element for light of the blue and red wavelength bands,
      a combination polarization beam splitter that combines an exit light from the first polarization beam splitter and an exit light from the second polarization beam splitter;
      a polarizing plate, arranged between the second polarization beam splitter and the combination polarization beam splitter, that analyzes an exit light in the blue wavelength band from the second polarization beam splitter, and
   the combination polarization beam splitter has a polarization beam splitting function for the red wavelength band and a dichroic function for the blue wavelength band and the green wavelength band.

* * * * *